(No Model.)

A. O. COREY.
TOOTH PICK.

No. 420,531. Patented Feb. 4, 1890.

Witnesses.
K. F. Steele
E. Masi.

Inventor.
Arthur O. Corey.
R. W. Steele
Atty.

UNITED STATES PATENT OFFICE.

ARTHUR O. COREY, OF COUNCIL GROVE, KANSAS.

TOOTH-PICK.

SPECIFICATION forming part of Letters Patent No. 420,531, dated February 4, 1890.

Application filed June 15, 1889. Serial No. 314,442. (No model.)

*To all whom it may concern:*

Be it known that I, ARTHUR O. COREY, a citizen of the United States of America, residing at Council Grove, in the county of Morris and State of Kansas, have invented certain new and useful Improvements in Tooth-Picks, of which the following is a specification, reference being had therein to the accompanying drawings.

My invention is an improved tooth-pick made of vulcanized rubber, or any other material having its equivalent characteristics, combining in said material for its manufacture safety, integrity, adaptability, elasticity, strength, durability, cleanliness, inexhaustive supply, and cheapness, making said tooth-picks vastly superior to those made of metal, wood, or quills.

Figures 1, 2, and 3 are several forms of said invention, showing points, chisel and wedge shaped ends.

Said tooth-picks are the safest in use, as they cannot injure the enamel of the teeth, being light, flexible, and elastic, and therefore conformable to any obstructive resistance, pressure, or shape of cavity, and not having the rigid and harsh elements belonging to metallic edges, points, and surfaces; also safer than either quill or wooden picks, as said rubber ones do not splinter or sliver, therefore preserving the interstices between the teeth from being clogged and the gums from being festered and ulcerated with wedged and embedded fragments and splinters, causing oftentimes great annoyance and discomfort, if not direct danger to the users of tooth-picks now generally made and furnished. Again, being cleanly, inodorous after use, and of great fineness of texture and appearance, these rubber tooth-picks become quickly the choice of the most fastidious and refined user of what is now almost universally considered an article of necessity in table-service. Finally, said rubber material being very durable and lasting, and by reason of its integrity and cleanliness in use, and being also inexhaustive in its readiness of supply to any manufacturing or commercial demand, said tooth-picks become the most economical articles of manufacture, use, and sale which can at present be placed upon the market or can be purchased under such conditions of cheapness, utility, and profit.

Therefore, what I claim as new, and desire to secure by Letters Patent, is—

As an article of manufacture, the tooth-pick of the forms substantially as shown and made of vulcanized-rubber material, substantially as and for the purposes herein specified.

In testimony whereof I affix my signature in presence of two witnesses.

ARTHUR O. COREY.

Witnesses:
T. S. HUFFAKER,
J. HAMMOND.